(No Model.)
C. L. BARRETT.
TIRE TIGHTENER.
No. 427,455.
Patented May 6, 1890.
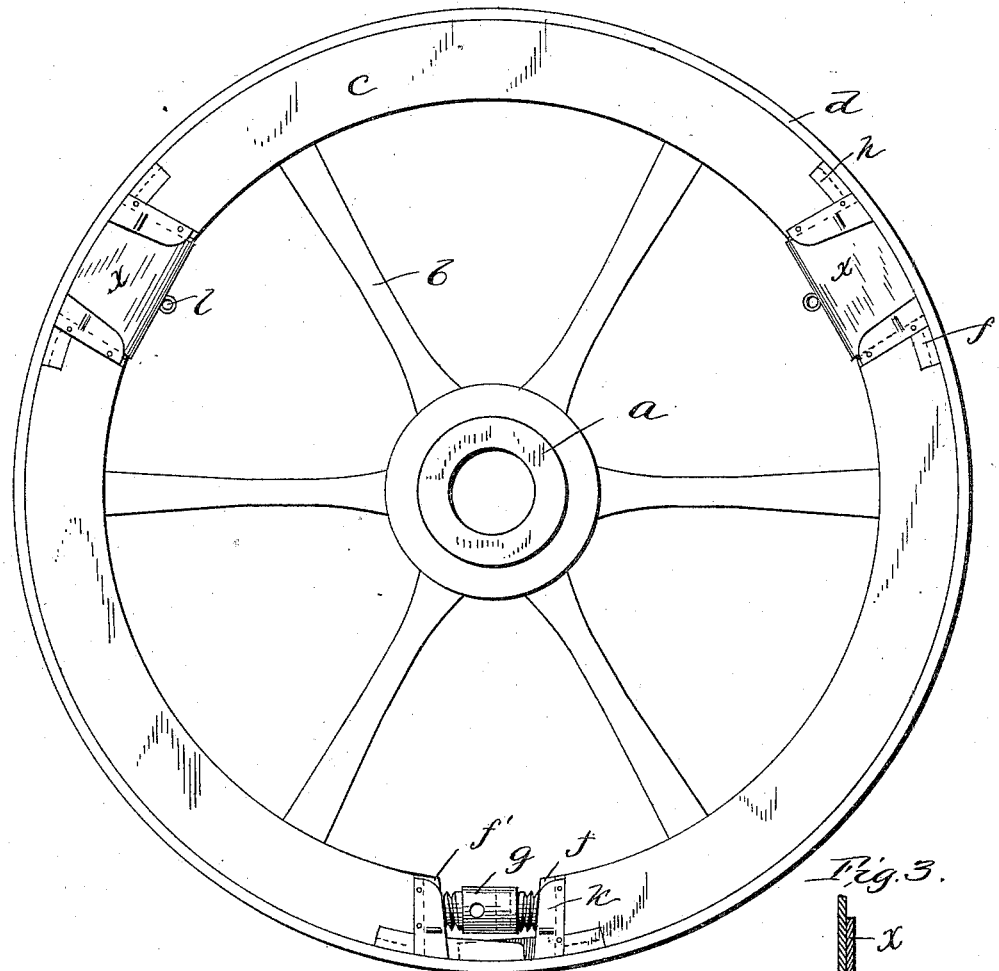
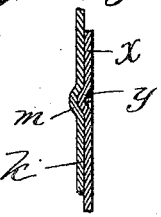
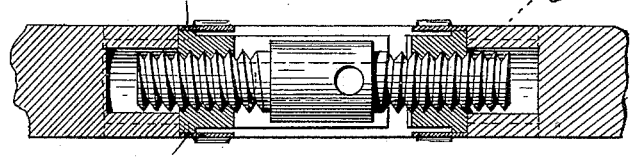
Witnesses
Walter P. Keene.
F. L. Middleton
Inventor.
Chas. L. Barrett
by Ellis Spear
Atty.

UNITED STATES PATENT OFFICE.

CHARLES L. BARRETT, OF KENT CITY, MICHIGAN.

TIRE-TIGHTENER.

SPECIFICATION forming part of Letters Patent No. 427,455, dated May 6, 1890.

Application filed February 8, 1890. Serial No. 339,693. (No model.)

*To all whom it may concern:*

Be it known that I, CHARLES L. BARRETT, of Kent City, in the county of Kent and State of Michigan, have invented a new and useful Improvement in Tire-Tighteners; and I do hereby declare that the following is a full, clear, and exact description of the same.

My invention has for its object the tightening of tires of wagon-wheels and the wheels of like vehicles by means of a simple device connected with the felly of the wheel, through which the tightening of the tire may be effected by an unskilled person.

In the accompanying drawings, in which I have shown my invention applied to a wheel of ordinary construction, Figure 1 represents a side elevation with the covering-cap removed to show the operating parts of one of the tightening devices. Fig. 2 is a section taken centrally through the screw and the threaded parts with which the screw engages. Fig. 3 is a detail sectional view through one edge of the covering-cap and its holding-flange.

In the drawings the wheel is shown as having the hub $a$, spokes $b$, a sectional felly $c$, and an ordinary tire $d$.

It will be understood that the invention may be applied to all kinds of wheels in which an iron or steel tire is used, and I do not limit myself, therefore, to its application.

The felly is shown as composed of sections, and between the ends of the adjoining sections I arrange my tightening devices for the purpose of expanding the felly and forcing it tightly against the tire to provide for any shrinkage which may have taken place. I have shown three of these devices; but it will be understood that I do not limit myself as to the number, and may use more or less. A space is left between the ends of the adjoining sections, and each end is provided with a shoe $f$ of angular shape, the vertical portion covering the end of the section, while the horizontal portion fits over the face of the felly. The end of the felly is perforated, and a screw-threaded hole is formed in the vertical part of the shoe, this hole being adapted to receive the threaded end of a screw $g$. The end of the adjoining section is provided with a similar shoe, and the vertical part has a corresponding hole screw-threaded to engage with the opposite end of the screw $g$, which has a thread on this end extending in the opposite direction to that on the other end. The central portion of the screw may be provided with holes for the end of an operating-tool; and it will be seen that by turning the body of the screw the threaded ends engage with the screw-threaded openings in the oppositely-placed shoes, and this will have the effect of spreading the ends of the sections when the screw is turned in one direction and relieving the pressure upon the ends when it is turned in the opposite direction.

In order to keep the parts together and make a continuous tread throughout the whole extent of the periphery of the felly, I provide the shoe $f'$ with a bifurcated extension, which is adapted to receive a tongue extending from the shoe $f$, and this construction, while allowing movement of the shoes toward and from each other, provides for the uninterruption of the felly periphery.

To further guide the shoes, they are made with overlapping flanges $h$, which are fitted to grooves formed in the sides of the felly and of such a depth as to bring the flanges flush with the main portion of the felly. The horizontal extensions of the shoes also fit grooves in the periphery of the felly ends, so that they come flush with the periphery, and thus present a perfectly-cylindrical surface throughout the extent of the periphery of the wheel.

I find it desirable in practice to protect the screw from sand and dirt, which would interfere with its perfect working by filling up the threads, and to this end I have provided a covering-cap $x$, which is approximately U shape in cross-section, the edges of this cap being held in place by spring guiding-flanges $k$, secured to the shoes so as to leave a space between them, which is adapted to receive the edges of the covering-cap and hold the same in place by means of the indentations $m$ and $y$. The cap is provided with a loop $l$, by which it may be readily removed.

What I claim is—

1. In combination with a divided felly, shoes fitted to the ends of adjacent sections, a screw in engagement with the shoes, and flanges $k$, secured to the sides of the shoes, with a space between them and the said shoes, and a protecting-cap, the ends of which are adapted to fit between the flanges and the shoes, substantially as described.

2. In combination with a sectional felly, the shoes engaging the adjacent ends of the sections, a screw in engagement with the shoes, and a protecting-cap adapted to cover the operating parts, held in place by spring-flanges, substantially as described.

In testimony whereof I have signed my name to this specification in the presence of two subscribing witnesses.

CHARLES L. BARRETT.

Witnesses:
JOHN MACK,
CHARLES W. LORD.